(12) United States Patent
Rehor

(10) Patent No.: US 12,169,072 B2
(45) Date of Patent: Dec. 17, 2024

(54) PREDICTIVE CONTROL FOR DOMESTIC HEATING SYSTEM

(71) Applicant: Ademco Inc., Golden Valley, MN (US)

(72) Inventor: Jiri Rehor, Cernosice (CZ)

(73) Assignee: Ademco Inc., Golden Valley, MN (US)

( * ) Notice: Subject to any disclaimer, the term of this patent is extended or adjusted under 35 U.S.C. 154(b) by 64 days.

(21) Appl. No.: 15/632,923

(22) Filed: Jun. 26, 2017

(65) Prior Publication Data
US 2018/0372341 A1 Dec. 27, 2018

(51) Int. Cl.
G05D 23/19 (2006.01)
F24D 19/10 (2006.01)
G05B 15/02 (2006.01)

(52) U.S. Cl.
CPC ......... F24D 19/1009 (2013.01); G05B 15/02 (2013.01); G05D 23/1905 (2013.01); G05D 23/1917 (2013.01); F24D 2220/003 (2013.01); G05B 2219/2614 (2013.01); G05B 2219/2642 (2013.01)

(58) Field of Classification Search
CPC ................. F24D 19/10; F24D 19/1009; F24D 2220/003; G05B 15/02; G05B 2219/2614; G05B 2219/2642; G05D 23/1905
See application file for complete search history.

(56) References Cited

U.S. PATENT DOCUMENTS

| | | | | |
|---|---|---|---|---|
| 5,190,215 A * | 3/1993 | Habermehl, Jr. | ... | G05D 23/1931 165/291 |
| 9,235,657 B1 * | 1/2016 | Wenzel | ................... | G06F 30/13 |
| 2015/0134124 A1 * | 5/2015 | Carter | ...................... | F24F 11/30 700/278 |
| 2015/0160099 A1 * | 6/2015 | Hamouz | ................ | G01K 17/06 702/45 |
| 2016/0246269 A1 * | 8/2016 | Ahmed | ...................... | F24F 11/62 |
| 2016/0299516 A1 * | 10/2016 | Holub | .................... | G05B 15/02 |
| 2016/0313751 A1 * | 10/2016 | Risbeck | ............... | G05B 13/048 |
| 2017/0219219 A1 * | 8/2017 | Miller | ....................... | F24D 3/02 |

(Continued)

OTHER PUBLICATIONS

Balan, Radu et al. Parameter identification and model based predictive control of temperature inside a house. Article in Energy and Buildings, vol. 43, 2011 pp. 748-758. [online] Retrieved from the Internet < URL: https://www.sciencedirect.com/science/article/pii/S0378778810003750> (Year: 2011).*

(Continued)

*Primary Examiner* — Kenneth M Lo
*Assistant Examiner* — Jonathan Michael Skrzycki
(74) *Attorney, Agent, or Firm* — Greenberg Traurig, LLP; Ryan D. Sharp; David J. Dykeman

(57) ABSTRACT

One or more systems, devices, and techniques for heating a structure using boiler water stored by a boiler are described herein. For example, a method includes obtaining gas consumption data for a heat source that is heating a structure and obtaining zone and ambient temperature data while the structure is being heated. Additionally, the method includes estimating unknown parameters of elements of a dynamic heat loss model as part of a model predictive control (MPC) model for the structure using inverse modeling as a function of the obtained gas consumption data and zone and ambient data.

20 Claims, 4 Drawing Sheets

(56) References Cited

U.S. PATENT DOCUMENTS

2018/0313557 A1* 11/2018 Turney ............... G05D 23/1904
2019/0017721 A1* 1/2019 Motodani ................ F24F 11/64

OTHER PUBLICATIONS

Zhang, Yuna An Inverse model with uncertainty quantification to estimate the energy performance of an office building. Aug. 2013. 13th Conference of International Building Performance Simulation Assc. [online] Retrieved from the Internet <URL: https://www.researchgate.net/profile/Yuna_Zhang3> (Year: 2013).*

Afram, Abdul et al. Review of modeling methods for HVAC systems. Article in Applied Thermal Engineering vol. 67 Jun. 2014 pp. 507-519. [online] Retrieved from the Internet <URL:https://www.sciencedirect.com/science/article/pii/S1359431114002348> (Year: 2014).*

Thermal Conductivity wikipedia entry. Archived entry from May 5, 2017. Retrieved from the Internet <URL: https://web.archive.org/web/20170515073523/https://en.wikipedia.org/wiki/Thermal_conductivity> (Year: 2017).*

Michael Dahl Knudsen et al. Model Predictive Control for demand response of domestic hot water preparation in ultra-low temperature district heating system. Apr. 17, 2017, Energy and Buildings #146, p. 55-64 (Year: 2017).*

Wikipedia article, "Thermal Mass", Mar. 2, 2017, retrieved from The Wayback Machine on Jun. 8, 2021, URL:<https://web.archive.org/web/20170302151123/https://en.wikipedia.org/wiki/Thermal_mass> (Year: 2017).*

* cited by examiner

PREDICTIVE CONTROL FOR DOMESTIC HEATING SYSTEM

BACKGROUND

A typical domestic gas boiler is manipulated using a room thermostat that provides an on/off signal when indoor temperature decreases/rises over a given threshold. In order to provide a better modulation for cold/warm days an equitherm regulation may be applied. Advanced controllers can offer better control strategies (e.g. Model Predictive Control—MPC), which can result in a higher efficiency and higher comfort than standard thermostats with equitherm regulation. On the other hand, such controllers typically requires more effort for deploying thus they are very uncommon for domestic use.

SUMMARY

A method includes obtaining gas consumption data for a heat source that is heating a structure, obtaining zone and ambient temperature data while the structure is being heated, and estimating unknown parameters of elements of a dynamic heat loss model as part of a model predictive control (MPC) model for the structure using inverse modeling as a function of the obtained gas consumption data and zone and ambient data.

A machine readable storage device having instructions for execution by a processor of the machine to perform operations. The operations include obtaining gas consumption data for a heat source that is heating a structure, obtaining zone and ambient temperature data while the structure is being heated, and estimating unknown parameters of elements of a dynamic heat loss model as part of a model predictive control (MPC) model for the structure using inverse modeling as a function of the obtained gas consumption data and zone and ambient data.

A device includes a processor and a memory device coupled to the processor and having a program stored thereon for execution by the processor to perform operations. The operations include obtaining gas consumption data for a heat source that is heating a structure, obtaining zone and ambient temperature data while the structure is being heated, and estimating unknown parameters of elements of a dynamic heat loss model as part of a master model predictive control (MPC) model for the structure using inverse modeling as a function of the obtained gas consumption data and zone and ambient data.

DETAILED DESCRIPTION

Figure 1:
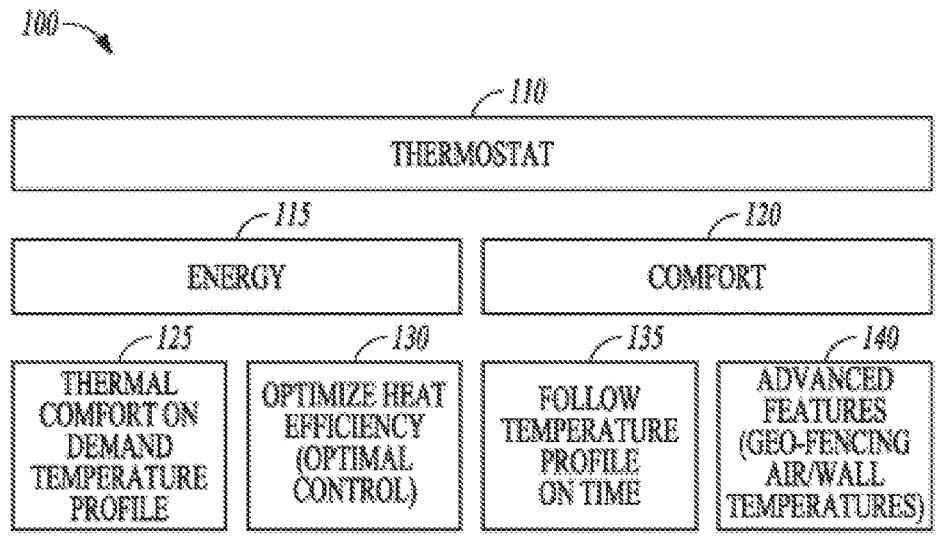
FIG. 1 is a block diagram illustrating advanced thermostat goals according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

A heating source controller such as a thermostat utilizes advanced (industrial) Model Predictive Control (MPC) for controlling a heating source for structures such as homes. The MPC employs signals like weather forecast and future room temperature demand and furthermore takes into consideration various physical constraints and efficiency curve of the heating source. As a result, an optimal balance of thermal comfort and energy consumption (or cost) can be achieved. In one embodiment, the heating source may be a domestic gas boiler.

In order to use model predictive control for a heating source for a structure such as used in residential heating, a model of a controlled system may be estimated. An optimization problem should be computationally tractable for embedded devices. Various embodiments of the present inventive subject matter address the computationally tractable aspects of the MPC and additionally address estimating the model of the controlled system.

Modeling of the controlled system is a prerequisite for MPC deployment. In the field of (family) house heating, there is generally an insufficient amount of information (due to a lack of sensors), which prevents developing a suitable model in a traditional manner. In various embodiments, the model may instead be developed by using additional data through smart gas meters. The gas consumption data can be used to estimate a rough heat loss model which is the central part of the MPC model. For other heat sources, e.g. heat pumps, a similar approach may be used. Moreover, as smart gas meters use an internet connection, the additional data for developing the model is likely readily available. Thus modeling can be carried out using cloud computing instead of the embedded controller. This lowers the demands on the computing power of the controller.

In order to balance thermal comfort and costs, optimal working points of the heat source and a heat source efficiency curve may be used. Specifically, for the gas-fired boilers the efficiency curve is a function (mainly) of the heat load and return water temperature. The latter is important especially for high-efficiency condensing boilers. A technical issue that is solved is how to deal with relatively fast dynamic of the heating system (hydronic heating+gas boiler) and slow dynamic of the house. A hydronic system is a system that uses water as a heat transfer medium in heating systems. Heated water is circulated via a pipe or pipes in a series loop. The problem is approached using two level MPC, where a high-level MPC solves an optimal heat load problem (not involving the efficiency curve), whereas the low-level MPC tries to deliver a given heat load in an optimal way regarding physical constraints of the heating system and efficiency curve. This approximates a computationally intractable optimal solution to the problem.

Moreover, a typical domestic gas boiler works in a switching mode. This is a consequence of over-sized gas boilers due to their twofold utilization: as a heat source and as a domestic water heater. MPC typically requires a constrained Quadratic Problem (QP) to be solved, but when a binary variable (boiler start/stop) is introduced the problem becomes mixed-Integer and hard to solve. The last problem addressed is the use of an approximation to this mixed-Integer QP problem that is tractable by embedded controllers. It is based on parallel evaluation of selected boiler on/off scenarios, which are generated using a described heuristic.

Embodiments are described that address households equipped with gas boilers and smart gas meters, such as Elster—owned by Honeywell. Another embodiment utilizes a thermostat controlling heat pumps. The efficiency curve of a heat pump is highly dependable on the ambient temperature and thus an optimal heating schedule based on the weather forecast may be adopted.

The use of model-based controllers for advanced thermostats has been already developed for large "smart" buildings for which there is sufficient information available from sensors to directly model the building. However, for house level heating systems for which there is generally much less data about the house from which to directly generate a model, model-based controllers have not been used. The MPC thermostats can establish a new framework for advanced thermostats, because they can easily adopt new features and they can naturally deal with multivariable control (multiple heat sources, multiple sensors).

Optimal control of a gas boiler for a domestic heating system is provided by using gas measurement data to estimate unknown parameters of a dynamic model of a house or other small or domestic structure such as a flat. Processing resources, such as cloud computing resources may be used to tune a Model Predictive Controller (MPC) for an embedded controller (thermostat) using the dynamic model with estimated parameters. An MPC optimization problem is formulated using a two-level scheme to deal with slow and fast dynamics of the domestic heating system.

In various embodiments, a user may have an electronic gas meter with ability to periodically measure and store (e.g. to a cloud) gas consumption data. The user may have a hydronic heating system with a gas boiler. The gas boiler can be operated by some common communication protocol (e.g. OpenTherm). The user may also have an Internet connection available (via WiFi/GSM module) to communicate with additional sensing, data, and computing resources. The user, or an installation specialist is provided the ability to add more details about the house or flat to the system.

The user and/or installation specialist may install the embedded device, such as a controller or smart thermostat, to a house or flat and connect it to the gas boiler via a bus or wireless connection, and to the Internet or other network. The user/installation specialist may set up the basic parameters about the house or flat and about the heating system using provided guidelines. Parameters are for example: geographical location, type of building, size of building or flat, type of gas boiler (standard efficiency/high efficiency), etc.

The controller may be switched to an "initialization phase" and acts like a standard or advanced thermostat. In the same time it collects all available data about gas boiler operation, indoor (zone) temperature(s) and outdoor temperature (when available). Data from the gas meter, and weather data that are relevant to the geo-location of the house or flat may be also stored in the cloud service or available through third party services.

Collected data are continuously analyzed in order to enable model parameter estimation of the house or flat. Note that when there is no heating season, no model can be estimated. By inverse modelling techniques, a grey box model of the house or flat may be estimated using a priori information from the user/installation specialist and using measured data. The estimation may be done using cloud computing, which lowers demands of a computing power of the embedded device. The estimated model is used for formulation of the MPC optimization problem.

The MPC parameterization is uploaded to the embedded device, which can be switched to an "advanced phase." In the "advanced phase" the MPC controller is running and monitored with respect to boiler operation (on/off switching, temperature limits and gas consumption) and temperature comfort. When the operation is unsatisfactory, the "initialization phase" is restored and the user is notified, such as via a thermostat display. Collecting more data or supplying additional a priori information may be necessary to do a next attempt to switch into the advanced mode. When the heat source, such as a boiler is operated correctly, a level of efficiency (working condition of the boiler) and a level of thermal comfort is monitored to provide an estimation of gas savings to the user.

One purpose of the MPC based advanced thermostat is to provide an optimal balance between thermal comfort and savings. A model based control algorithm uses predicted behavior of the system; i.e. hydronic circuit+house or flat dynamic response to a possible (optimized) control actions and ambient conditions (disturbances). The optimal control actions are searched using numerical optimization with respect to given constraints.

FIG. 1 is a block diagram illustrating advanced thermostat goals generally at 100. A thermostat 110 is shown as balancing energy consumption 115 to save energy with thermal comfort 120. Thermal comfort is considered as a condition of mind which expresses satisfaction with thermal environment. We cut down on so called operative temperature which is a combination of a room (air) temperature and wall (radiation) temperature. In other words, a user can feel thermal comfort in a room heated to a 20 degree Celsius with walls at 18 degree Celsius, whereas the user may feel thermal discomfort when the walls are at 10 degree Celsius.

The main potential for savings is related to providing thermal comfort on demand as represented at 125. The reference (operative) temperature depends on the occupation and time of a day. A user might want to have lower temperature in the night, comfortable temperature in the morning and low temperature during a day when the house or flat is unoccupied. A simple approach of switching the heating on and off with some hysteresis (a relay) has several disadvantages. Heating the house or flat to a given set-point depends on the ambient conditions and current heat accumulation within the walls and furnishings, so the reference temperature may be hard to achieve on time. Moreover, the boiler is typically operated in a fixed settings (e.g. constant supply water temperature), which may even prolong the time to fulfil the set-point and forces boiler to operate in a suboptimal way as represented at 130. A typical issue is a condensing (high-efficiency) boiler operated on high return water temperature, such that condensing cannot fully occur. With a proper planning and model based prediction, the controller can fire the boiler in advance to deliver thermal comfort on time as represented at 135 where a temperature profile is followed on time, and in a high efficient mode.

Thermal comfort is not necessarily equal to room temperature. Thermal comfort may be evaluated as operative temperature, $T_O$, which has two main components. Air temperature, and mean radiant (walls) temperature.

Using the prediction capabilities of MPC, optimal heating with respect to physical constraints and efficiency curve can be achieved. Operative temperature (instead of air temperature) can be used to provide more degree of freedom in optimization. The overall performance depends highly on the quality of the model. It's ability to correctly predict the response of the system. Advanced features are represented at 140, where the controller may include geo-fencing and air/wall temperatures.

Such models typically need proper modelling and costly experimentation, which is in advanced control for industrial applications. One approach is to use additional information coming from gas meters and using a thermal balance equation estimate the typically unknown parameters of a structured dynamical model (grey-box model) of a house or flat.

Figure 2:
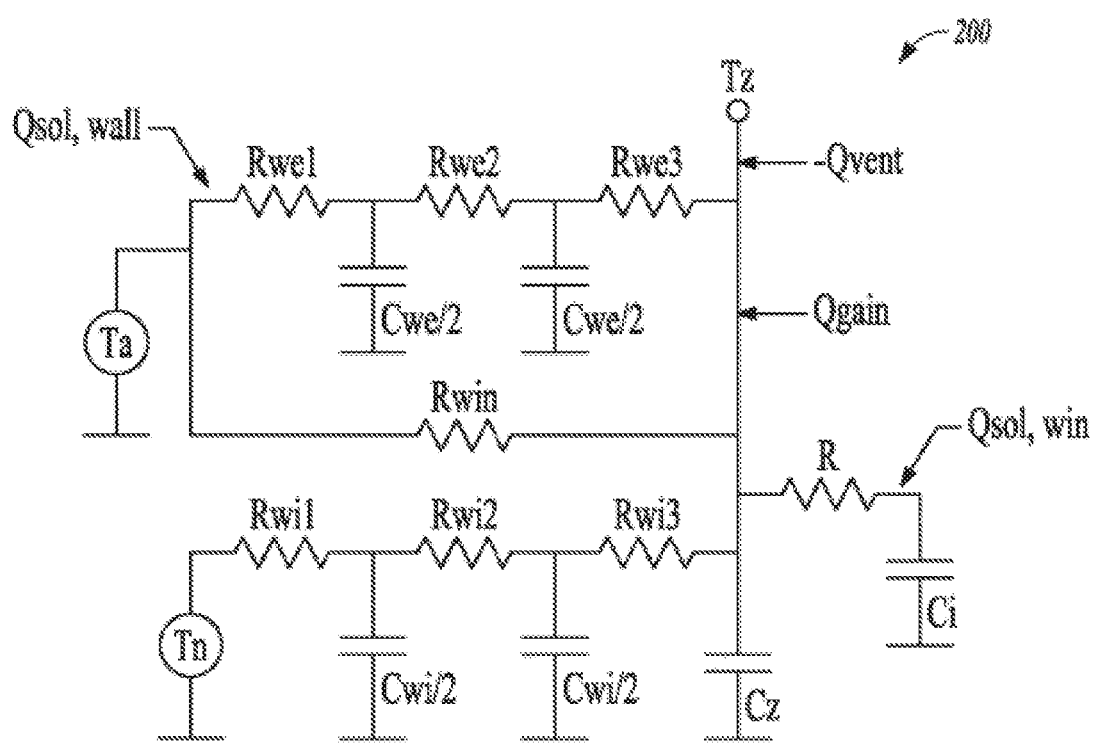
FIG. 2 is a schematic representation of a Grey-box model of a simple flat or house according to an example embodiment.

FIG. 2 is a schematic representation of a Grey-box model 200 of a simple flat or house. The letters and corresponding electrical symbols for R and C correspond to thermal resistivity and capacity respectively for heat loss features, such as walls or windows in the simple flat or house; Ta, Tn and Tz are ambient, next-door and zone temperatures, Qvent is heat flow due to ventilation, Qsol is heat input due to the sun activity, Qgain is a sum of other heat gains, mainly the hydronic heating.

Grey-box modelling allows for easy inference of a priori knowledge of the system with measured data. Based on the amount of information provided in advance by a user/installation specialist a simple or more sophisticated model structure can be defined for parameter estimation.

When a parameterized model of a house or flat is defined (like the simple model 200, the next step is to specify a set of measured signals (directly measured or indirectly e.g. using weather services) that are to be logged and used for inverse modelling. Inverse modeling is a process of parameter estimation where a selected subset of parameters of the grey-box model 200 are searched with respect to model prediction error minimization. The parameters are typically related to some physical properties; e.g., wall and window thermal resistivity/capacity, such that their values may be reasonably limited to a given predetermined known range for walls and windows constructed of different known materials. For instance, the range of thermal resistivity is fairly well known for windows constructed with double panes of glass by various companies.

In one embodiment, a reasonable model for MPC can be obtained using inverse modeling with data collected by our advanced thermostat (boiler operation data and zone/ambient temperature data) supplemented by weather data (corresponding to a given geo-location), gas measurement data (provided by smart gas meters) and user data (specifying rough parameters of a house or flat). In one embodiment, ambient data that may be used to supplement the model may include solar activity as well (all available information from weather services.

Figure 3:
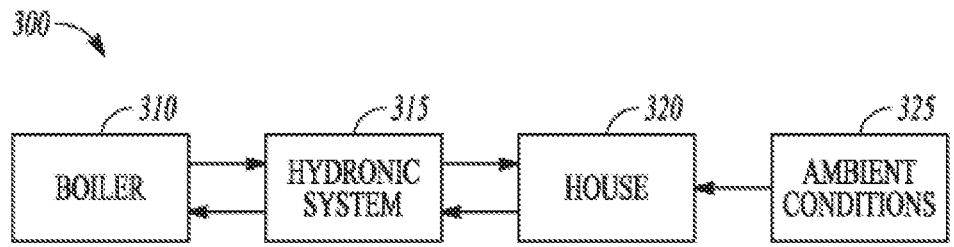
FIG. 3 is a block structure diagram of a lumped model where an order of mutual interactions is illustrated according to an example embodiment.

FIG. 3 is a block structure diagram of the resulting lumped model 300, where the order of mutual interactions is illustrated. A boiler block 310 interacts with a hydronic system 315, which interacts with the house/flat 320, which is affected by ambient conditions 325. Model 300 is used to predict future behavior of house 325 temperatures (zone/walls) and hydronic system 315 temperatures (especially return water temperature) and heat flow. Predictions are computed with respect to an estimated current state of the dynamic model and future manipulated inputs (boiler loads) and estimated disturbances (ambient conditions).

Figure 4:
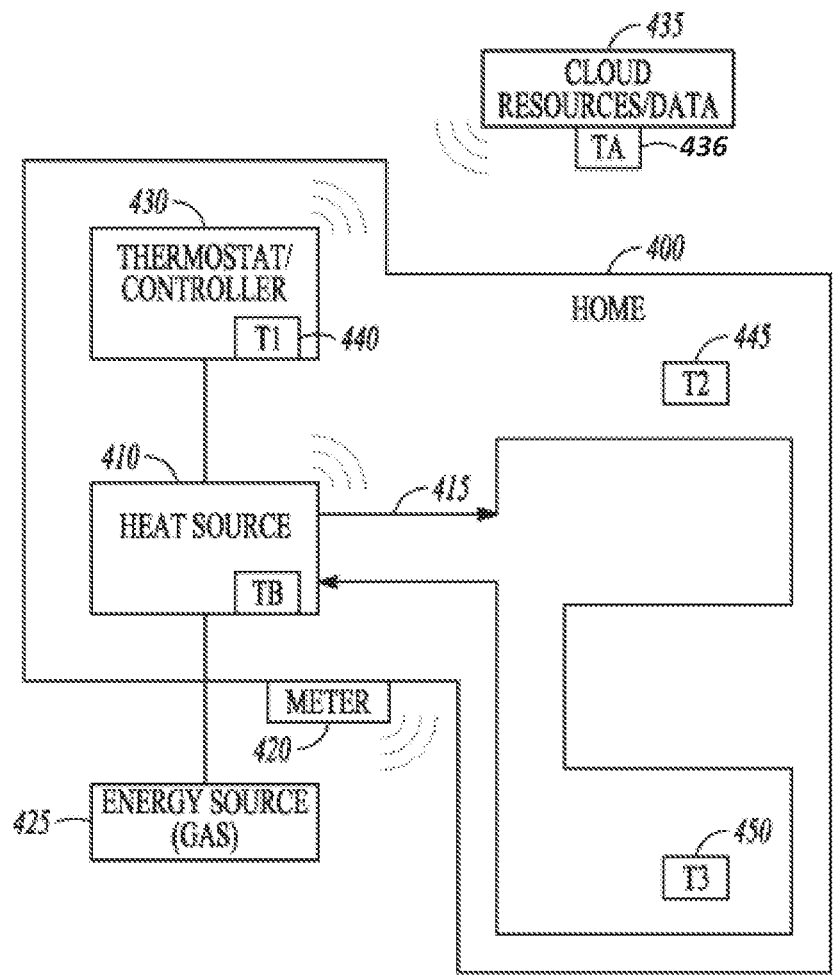
FIG. 4 is a block diagram of an actual flat/house incorporating a heating system and controller according to an example embodiment.

FIG. 4 is a block diagram of an actual flat/house 400 incorporating the heating system and controller. The heating system includes a heating source 410, such as a boiler or other heat producing mechanism that heats water that is transferred through pipes 415 through selected portions of the house 400. A gas meter 420 may provide gas 425 to the heat source 410. The gas meter 420 may have a wired or wireless connection to provide gas flow measurements to a thermostat/controller 430 or directly to cloud resources 435. The thermostat/controller 430 may run the model to provide control actions to heat source 410.

In addition to receiving gas consumption data via meter 420, several temperature sensors may also provide temperature information, such as various zone temperatures sensors T1 at 440, T2 at 445, and T3 at 450 which may be located in different heating zones. T1 may be integrated with thermostat 430 in some embodiments. Ambient temperature may be provided by a temperature sensor TA at 436, which may be wirelessly coupled via could resources 435, or alternatively TA 436 may be located near the structure 400 and wired or wirelessly coupled to provide ambient temperature data to thermostat/controller 430.

Whereas a standard approach for MPC implementation is to do model identification by a system engineer specialist using some reference system (e.g. tuning controller for a particular type of diesel engine), in various embodiments described herein, a large variety of systems (different houses or flats) and thus some type of automatic deployment of the MPC optimization problem may be performed.

For that reason a dual behavior of the controller may be considered. In a first mode or phase, when no data is collected or only limited information is available from a measurement history, the controller works like any standard thermostat. In the first mode, a selected reference profile is tracked using "on/off" modulation of the boiler with a standard (designed) operation—typically constant supply water temperature. When a sufficient amount of data is collected the inverse modelling is done and controller switches to an "advanced mode."

Figure 5:
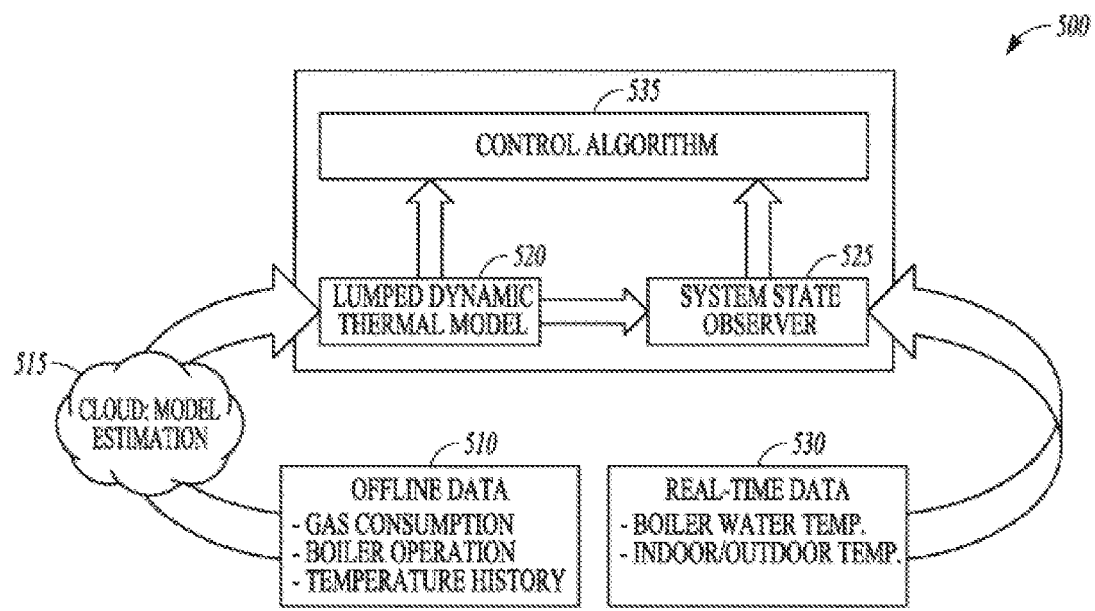
FIG. 5 is a block flow diagram illustrating controller functionality according to an example embodiment.

As the inverse modelling typically requires more effort by means of computational load than the resulting MPC controller operation, the task of inverse modelling may be performed by cloud based computing, where more powerful solvers can be used. FIG. 5 is a block flow diagram illustrating a method 500 of performing dual functionality of the controller. Offline data 510 is used for inverse modelling 515 providing a lumped dynamic model 520 of a house or flat together with a corresponding heating system. This model is then used by a state observer 525 to estimate dynamic state of the system using a real-time data 530 collected by the advanced controller. Using the state and the model and having predicted disturbances (weather forecast) an optimal control sequence is evaluated using numerical optimization (typically quadratic programming) via a control algorithm 535.

To be more specific, we assume the following formulation of MPC:

$$\min_{u(t), t \in [0,24)} a V_{dis}(u(t)) + (1-a) V_{fuel}(u(t))$$

$$\text{subject to: } 0 < u(t) < U_{max}; T_{w,min} < T_w(t) < T_{w,max}$$

where u (t), t∈[0, 24) is heat load (load delivered by a boiler to a hydronic circuit) signal over 24 hours, α ∈ (0;1) is a manipulated weighting factor (temperature comfort vs. savings balance)

$$V_{dis} = \frac{1}{24} \int_{t=0}^{24h} \|T_o(t) - r(t)\|_2^2 dt, r_{min}(t) < r(t) < r_{max}(t)$$

is a discomfort measure for a 24 h period. Here
  a. $r(\tau)_{min}$ and $r(\tau)_{max}$ are minimum and maximum operative temperature (reference profile)
  b. $T_o(\tau)$ is a predicted operative temperature.

$$V_{fuel} = \frac{c_f}{24} \int_{t=0}^{24h} f(u(t), T_{RW}(t)) dt$$

is a fuel cost of 24 h prediction horizon. Here
  a. $c_f$ is a fuel normalization constant (corresponds to a typical 24 h gas consumption [kWh])
  b. $f(u(t), T_{RW}(t))$ is a fuel cost function in [kW] (typically parameterized using heat load and return water temperature)

In order to have a numerically tractable solution to the optimization problem further simplifications may be used to provide an approximation to an optimal MPC. Typical settling times of house or flat temperatures are relatively long: from several hours to several days, whereas response of the hydronic circuit to a heat load change (boiler set-point change) is typically in order of minutes. The controller may be split into two levels to deal with the very different settling times and response of the hydronic circuit.

A high level (or MASTER) controller will operate on a long 24 h prediction horizon and uses weather forecast and estimated heat accumulation in walls and other structures. As a result, the MASTER controller defines optimal heat input continuously modulated from 0 to maximum load. The MASTER controller assumes only a simple heat source model and a piecewise constant heat load input $u_{SP}(t)=u_{sp}(k)$, $t \in [kT_s, (k+1)T_s)$.

Note that indexing using "k" we consider a discrete-time, i.e. $T(k)@T(t), t=k \times T_{samp}$ The MASTER MPC is optimizing an optimal sequence $u_{sp}(k)$ of heat load set-points, using a model of a house or flat with a simplified hydronic subsystem and using a 24 h weather forecast. For example, assuming 0.5 h sampling, the MASTER MPC cost function may look like as follows:

$$u_{SP}^*(k) = \arg\min_{u_{SP}(k), r(k), T_w(k)}$$

$$\left\{ (1-a) \frac{1}{48} \sum_{k=1}^{48} u_{SP}(k) + a \frac{1}{48} \sum_{k=1}^{48} \|T_o(k) - r(k)\|_2^2 + g_1 \frac{1}{48} \sum_{k=1}^{48} \|T_w(k) - T_w^\#(k)\|_2^2 \right\},$$

$$r_{min}(k) < r(k) < r_{max}(k), T_{wmin} < T_w^\#(k) < T_{wmax}, 0 < u_{SP}(k) < u_{max}.$$

Here $g_1$ is an overheating penalty (soft constraint) for supply water temperature, $u_{sp}(k)$ are optimized heat loads, $T_o(k)$ are predicted operative temperatures, $T_w(k)$ are predicted water temperatures, $T_w^\#(k)$ are slack variables that penalizes water temperatures that are out of a given region $T_{w,min}$ and $T_{w,max}$.

The optimal sequence of the heat loads is passed to a low level (SLAVE MPC) controller to provide prediction for optimal heat load delivery considering physical limitations of a real heat source, such as a gas boiler, focusses on maximum efficiency for optimal heat delivery, evaluates optimal start/stop time to reduce switching, and may use a simplified model of a household having constant temperature of walls. The SLAVE MPC solves a slightly modified criterion over a shortened prediction horizon (e.g. 3 h) to find an optimal boiler set-point sequence $w_k$:

$$w_k^* = \arg\min_{w_k} a V_{dis}(w_k) + (1-a) V_{fuel}(w_k) + g_1 V_{OH}(w_k) + g_2 V_{load}(w_k)$$

Here: $V_{dis}(X)$ and $V_{fuel}(x)$ are discomfort and fuel cost functions, $V_{OH}(x)$ is the overheating cost function $$V_{OH} = \sum_{k=1}^{n_p} \|T_w(k) - T_w^\#(k)\|_2^2, T_{w,min} < T_w^\#(k) < T_{w,max}.$$

The overheating cost function controls the upper and possible lower supply water temperature. Finally, $V_{load}(X)$ is a load delivery cost function, which is responsible for delivering heat load required by the MASTER MPC to the system in order to stabilize long-term temperatures:

$$V_{load} = \sum_{k=1}^{n_p} \|w_k - U_k^\#\|_2^2, U_k^* < U_k^\#,$$

where $W_k$ are predicted total heat loads at time "k", $U_k^\#$ are slack variables and $$U_k^* = \sum_{j=1}^{k} u_{SP}^*(j)$$

are total heat loads computed by the MASTER MPC.

Note that by one analysis, an efficiency map that relates heat load with fuel consumption using boiler return water temperature can be well approximated by a quadratic function. This enables use of a fuel cost function, parameterized by $Q_f$, $f_f$, $c_f$, in the following way $$f(u_k, T_{RW,k}) = \begin{cases} \sum_{k=1}^{n_1} z_k^T Q_f z_k + z_k^T f_f + c_f, & \text{when boiler is on} \\ 0, & \text{when boiler is off} \end{cases}$$

$$z_k = [u_k T_{RW,k}]^T$$

and uses it within the quadratic optimization problem of SLAVE MPC.

The last thing solved is the non-linear behavior of the boiler. Typical SE and HE boilers have a modulated heat load starting from some non-zero load. Typically, SE boilers are operated starting from 40% of maximum load, HE boilers can be operated starting from 20% of maximum load. Moreover, when a boiler is fired on an initialization procedure follows. During this procedure a minimum load is held for a given period of time to prevent boiler overheating. This makes the optimization task more challenging due to a resulting mixed integer programming problem.

One approach is to use a "scenario" approach instead of a mixed integer problem, where different possible on/off scenarios are generated with respect to defined minimum running and minimum stand-by times. Under some sampling assumptions a reasonable (e.g. 2^5) number of possible on/off scenarios can be generated and resulting SLAVE MPC optimization task can be evaluated using low cost embedded device. Scenario with the lowest overall cost of the criterion function is selected and a corresponding control action is applied.

Figure 6:
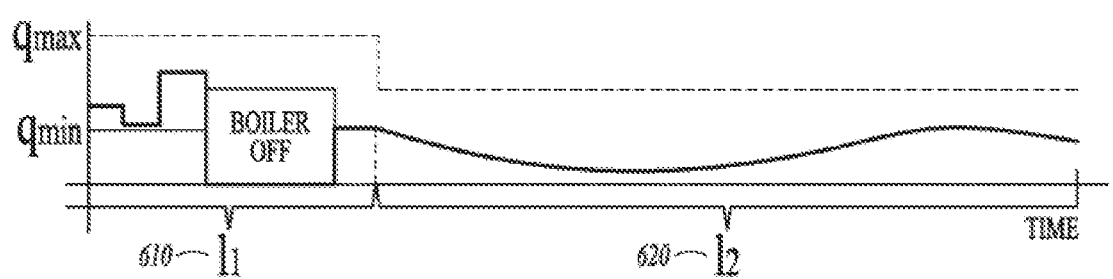
FIG. 6 is a graph illustrating a model predictive control (MPC) prediction horizon divided into two intervals according to an example embodiment.

To further increase solvability, the SLAVE MPC prediction horizon may be divided into two intervals as illustrated at graph 600 in FIG. 6. Over the first interval (I1) at 610, various scenarios are considered, whereas for the second interval (I2) at 620 a continuous modulation of the boiler is assumed. The interval (I2) 620 is introduced to deal with feasibility issues of the SLAVE MPC within receding horizon operation and to limit the number of scenarios that would be generated for a full (e.g. 3 h) prediction horizon.

Figure 7:
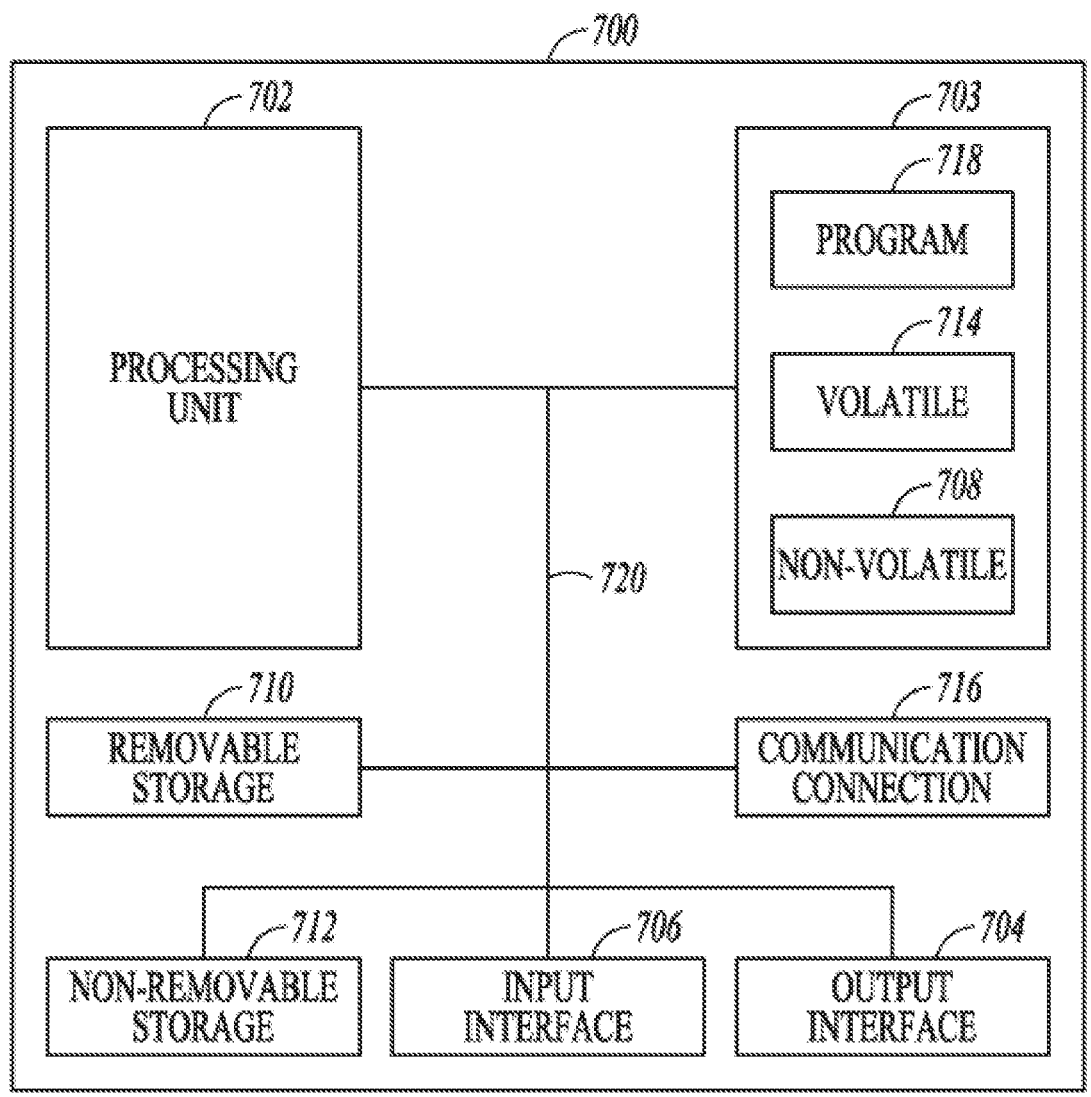
FIG. 7 is a block diagram illustrating a computer system to implement methods, algorithms, and controllers according to an example embodiment.

FIG. 7 is a block schematic diagram of a computer system 700 to implement methods according to example embodiments. All components need not be used in various embodiments.

One example computing device in the form of a computer 700 may include a processing unit 702, memory 703, removable storage 710, and non-removable storage 712. Although the example computing device is illustrated and described as computer 700, the computing device may be in different forms in different embodiments. For example, the computing device may instead be a smartphone, a tablet, smartwatch, or other computing device including the same or similar elements as illustrated and described with regard to FIG. 7. Devices, such as smartphones, tablets, and smartwatches, are generally collectively referred to as mobile devices or user equipment. Further, although the various data storage elements are illustrated as part of the computer 700, the storage may also or alternatively include cloud-based storage accessible via a network, such as the Internet or server based storage.

Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input interface 706, output interface 704, and a communication interface 716. Output interface 704 may include a display device, such as a touchscreen, that also may serve as an input device. The input interface 706 may include one or more of a touchscreen, touchpad, mouse, keyboard, camera, one or more device-specific buttons, one or more sensors integrated within or coupled via wired or wireless data connections to the computer 700, and other input devices. The computer may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, WiFi, Bluetooth, or other networks. According to one embodiment, the various components of computer 700 are connected with a system bus 720.

Computer-readable instructions stored on a computer-readable medium are executable by the processing unit 702 of the computer 700, such as a program 718. The program 718 in some embodiments comprises software that, when executed by the processing unit 702, performs network switch operations according to any of the embodiments included herein. A hard drive, CD-ROM, and RAM are some examples of articles including a non-transitory computer-readable medium such as a storage device. The terms computer-readable medium and storage device do not include carrier waves or propagating signals to the extent carrier waves are deemed too transitory. Storage can also include networked storage, such as a storage area network (SAN). Computer program 718 may be used to cause processing unit 702 to perform one or more methods or algorithms described herein.

EXAMPLES

1. A method comprising:
obtaining gas consumption data for a heat source that is heating a structure;
obtaining zone and ambient temperature data while the structure is being heated; and
estimating unknown parameters of elements of a dynamic heat loss model as part of a model predictive control (MPC) model for the structure using inverse modeling as a function of the obtained gas consumption data and zone and ambient data, such as ambient temperature data.

2. The method of example 1 wherein the unknown parameters are constrained within a predetermined expected range of the elements of the model.

3. The method of example 2 wherein the elements comprise wall thermal resistivity and windows thermal resistivity.

4. The method of example 3 wherein the elements comprise wall thermal capacity.

5. The method of any of examples 1-4 wherein the unknown parameters are further estimated as a function of obtained weather data.

6. The method of any of examples 1-5 wherein the unknown parameters are estimated via use of cloud computing resources.

7. The method of any of examples 1-6 wherein the heat source comprises a boiler, and wherein the unknown parameters are further estimated as a function of obtained temperature of boiler water.

8. The method of any of examples 1-7 and further comprising controlling the heat source to be on or off using the MPC model with estimated parameters and weather forecast to evaluate an optimal control sequence.

9. The method of example 8 wherein the optimal control sequence is selected by evaluating multiple on/off scenarios.

10. A machine readable storage device having instructions for execution by a processor of the machine to perform operations comprising:
obtaining gas consumption data for a heat source that is heating a structure;
obtaining zone and ambient temperature data while the structure is being heated; and
estimating unknown parameters of elements of a dynamic heat loss model as part of a model predictive control (MPC) model for the structure using inverse modeling as a function of the obtained gas consumption data and zone and ambient data.

11. The machine readable storage device of example 10 wherein the unknown parameters are constrained within a predetermined expected range of the elements of the model.

12. The machine readable storage device of example 11 wherein the elements comprise wall thermal resistivity, windows thermal resistivity, and wall thermal capacity.

13. The machine readable storage device of any of examples 10-12 wherein the unknown parameters are further estimated as a function of obtained weather data, wherein the heat source comprises a boiler, and wherein the unknown parameters are further estimated as a function of obtained temperature of boiler water.

14. The machine readable storage device of any of examples 10-13 and further comprising controlling the heat source to be on or off using the MPC model with estimated parameters and weather forecast to evaluate an optimal control sequence.

15. The machine readable storage device of example 14 wherein the optimal control sequence is selected by evaluating multiple on/off scenarios.

16. A device comprising:
a processor; and
a memory device coupled to the processor and having a program stored thereon for execution by the processor to perform operations comprising:
obtaining gas consumption data for a heat source that is heating a structure;
obtaining zone and ambient temperature data while the structure is being heated; and
estimating unknown parameters of elements of a dynamic heat loss model as part of a master model predictive control (MPC) model for the structure using inverse modeling as a function of the obtained gas consumption data and zone and ambient data.

17. The device of example 16 wherein the unknown parameters are constrained within a predetermined expected range of the elements of the model.

18. The device of example 17 wherein the elements comprise wall thermal resistivity, windows thermal resistivity, and wall thermal capacity.

19. The device of any of examples 16-18 wherein the unknown parameters are further estimated as a function of obtained weather data, wherein the oversized heat source comprises a boiler, and wherein the unknown parameters are further estimated as a function of obtained temperature of boiler water.

20. The device of any of examples 16-19 wherein the operations further comprise controlling the heat source to be on or off using the MPC model with estimated parameters and weather forecast to evaluate an optimal control sequence and wherein the optimal control sequence is selected by evaluating multiple on/off scenarios.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
obtaining an outside temperature forecast for an area outside of a structure, wherein the outside temperature forecast includes a period of time following a present time;
determining a sequence of boiler set points for a boiler using a model predictive control (MPC) model for the structure using inverse modeling, wherein the MPC model comprises:
unknown parameters of elements of a dynamic heat loss model,
wherein the unknown parameters are constrained within a predetermined expected range of the elements of the dynamic heat loss model, and
wherein gas consumption data from a gas meter for the boiler is used to estimate the unknown parameters,
a first control algorithm that accepts the outside temperature forecast as an input and generates a sequence of heat load set points over a first prediction horizon as an output, each heat load set point of the sequence of heat load set points representing a target heat load to be delivered by the boiler to a hydronic circuit at a time associated with the respective heat load set point; and
a second control algorithm that accepts the sequence of heat load set points and a return water temperature, the return water temperature determined for heated water circulated via a series of pipes, as inputs and generates the sequence of boiler set points over a second prediction horizon as an output based on a determined efficiency for a respective heat load set point of the sequence of heat load set points, each boiler set point of the sequence of boiler set points representing a target parameter of the boiler at a time associated with the respective boiler set point, wherein the second prediction horizon is shorter than the first prediction horizon, the determined efficiency corresponding to a fuel cost for the respective heat load set point of the sequence of heat load set points determined as a function of the respective heat load set point and the return water temperature; and
controlling, based on the MPC model including the sequence of heat load set points and the sequence of boiler set points, the boiler to heat the structure.

2. The method of claim 1, wherein the elements comprise wall thermal resistivity and windows thermal resistivity.

3. The method of claim 2, wherein the elements further comprise wall thermal capacity.

4. The method of claim 1, further comprising determining the unknown parameters of the MPC model via use of cloud computing resources.

5. The method of claim 1, wherein controlling the boiler to heat the structure comprises controlling the boiler to be on or off using the MPC model to evaluate an optimal control sequence.

6. The method of claim 5, further comprising selecting the optimal control sequence by evaluating multiple on/off scenarios.

7. The method of claim 1, wherein the first control algorithm determines a set of predicted operative temperatures based on a set of air temperatures within the structure and a set of wall temperatures within the structure and generates the sequence of heat load set points based on the set of predicted operative temperatures, a set of predicted water temperatures, and a set of slack variables,
wherein each heat load set point of the sequence of heat load set points corresponds to a respective predicted operative temperature of the set of predicted operative temperatures,
wherein each heat load set point of the sequence of heat load set points corresponds to a respective predicted water temperature of the set of predicted water temperatures, and
wherein each heat load set point of the sequence of heat load set points corresponds to a respective slack variable of the set of slack variables.

8. The method of claim 1, wherein the second control algorithm generates the sequence of boiler set points based on a load delivery cost function that accepts the sequence of heat load set points as an input.

9. The method of claim 1, wherein the first control algorithm accepts the outside temperature forecast as the input and also accepts an estimated heat accumulation in walls of the structure as a further input.

10. The method of claim 1, wherein the second prediction horizon comprises a first interval and a second interval distinct from the first interval, wherein the first interval comprises considering various on/off scenarios for the boiler, and wherein the second interval comprises assuming a continuous modulation of the boiler.

11. A non-transitory computer-readable medium storing instructions that when executed by a processor cause the processor to:
obtain an outside temperature forecast for an area outside of a structure, wherein the outside temperature forecast includes a period of time following a present time;
determine a sequence of boiler set points for a boiler using a model predictive control (MPC) model for the structure using inverse modeling, wherein the MPC model comprises:
unknown parameters of elements of a dynamic heat loss model,
wherein the unknown parameters are constrained within a predetermined expected range of the elements of the dynamic heat loss model, and
wherein gas consumption data from a gas meter for the boiler is used to estimate the unknown parameters;
a first control algorithm that accepts the outside temperature forecast as an input and generates a sequence of heat load set points over a first prediction horizon as an output, each heat load set point of the sequence of heat load set points representing a target heat load to be delivered by the boiler to a hydronic circuit at a time associated with the respective heat load set point; and
a second control algorithm that accepts the sequence of heat load set points and a return water temperature, the return water temperature determined for heated water circulated via a series of pipes, as inputs and generates the sequence of boiler set points over a second prediction horizon as an output based on a determined efficiency for a respective heat load set point of the sequence of heat load set points, each boiler set point of the sequence of boiler set points representing a target parameter of the boiler at a time associated with the respective boiler set point,
wherein the second prediction horizon comprises a first interval and a second interval distinct from the first interval, wherein the first interval comprises a consideration of various on/off scenarios for the boiler, and
wherein the second interval comprises an assumption of a continuous modulation of the boiler,
wherein the second prediction horizon is shorter than the first prediction horizon, the determined efficiency corresponding to a fuel cost for the respective heat load set point of the sequence of heat load set points determined as a function of the respective heat load set point and the return water temperature; and
control, based on the MPC model including the sequence of heat load set points and the sequence of boiler set points, the boiler to heat the structure.

12. The computer-readable medium of claim 11, wherein the MPC model comprises unknown parameters of elements of a dynamic heat loss model, and wherein the unknown parameters are constrained within a predetermined expected range of the elements of the dynamic heat loss model.

13. The computer-readable medium of claim 12, wherein the elements comprise at least one of wall thermal resistivity, windows thermal resistivity, or wall thermal capacity.

14. The computer-readable medium of claim 11, wherein controlling the boiler to heat the structure comprises controlling the boiler to be on or off using the MPC model to evaluate an optimal control sequence.

15. The computer-readable medium of claim 14, wherein the instructions further cause the processor to select the optimal control sequence by evaluating multiple on/off scenarios.

16. The computer-readable medium of claim 11, wherein the first control algorithm accepts the outside temperature forecast as the input and also accepts an estimated heat accumulation in walls of the structure as a further input.

17. A device comprising:
a processor; and
a memory electrically connected to the processor, wherein the memory is configured to store a program that includes a model predictive control (MPC) model, wherein the processor is configured to:
obtain an outside temperature forecast for an area outside of a structure, wherein the outside temperature forecast includes a period of time following a present time;
determine a sequence of boiler set points for a boiler using MPC model for the structure using inverse modeling, wherein the MPC model comprises:
unknown parameters of elements of a dynamic heat loss model,
wherein the unknown parameters are constrained within a predetermined expected range of the elements of the dynamic heat loss model, and
wherein gas consumption data from a gas meter for the boiler is used to estimate the unknown parameters, a first control algorithm that accepts the outside temperature forecast as an input and generates a sequence of heat load set points over a first prediction horizon as an output, each heat load set point of the sequence of heat load set points representing a target heat load to be delivered by the boiler to a hydronic circuit at a time associated with the respective heat load set point; and a second control algorithm that accepts the sequence of heat load set points and a return water temperature, the return water temperature determined for heated water circulated via a series of pipes, as inputs and generates the sequence of boiler set points over a second prediction horizon as an output based on a determined efficiency for a respective heat load set point of the sequence of heat load set points, each boiler set point of the sequence of boiler set points representing a target parameter of the boiler at a time associated with the respective boiler set point, wherein the second prediction horizon is shorter than the first prediction horizon, the determined efficiency corresponding to a fuel cost for the respective heat load set point of the sequence of heat load set points determined as a function of the respective heat load set point and the return water temperature; and control, based on the MPC model including the sequence of heat load set points and the sequence of boiler set points, the boiler to heat the structure.

18. The device of claim 17, wherein the elements comprise at least one of wall thermal resistivity, windows thermal resistivity, or wall thermal capacity.

19. The device of claim 17, wherein the processor is configured to control the boiler to heat the structure by at least controlling the boiler to be on or off using the MPC model to evaluate an optimal control sequence, and wherein the optimal control sequence is selected by evaluating multiple on/off scenarios.

20. The device of claim 17, wherein the second prediction horizon comprises a first interval and a second interval distinct from the first interval, wherein the first interval comprises a consideration of various on/off scenarios for the boiler, and wherein the second interval comprises an assumption of a continuous modulation of the boiler.

\* \* \* \* \*